UNITED STATES PATENT OFFICE.

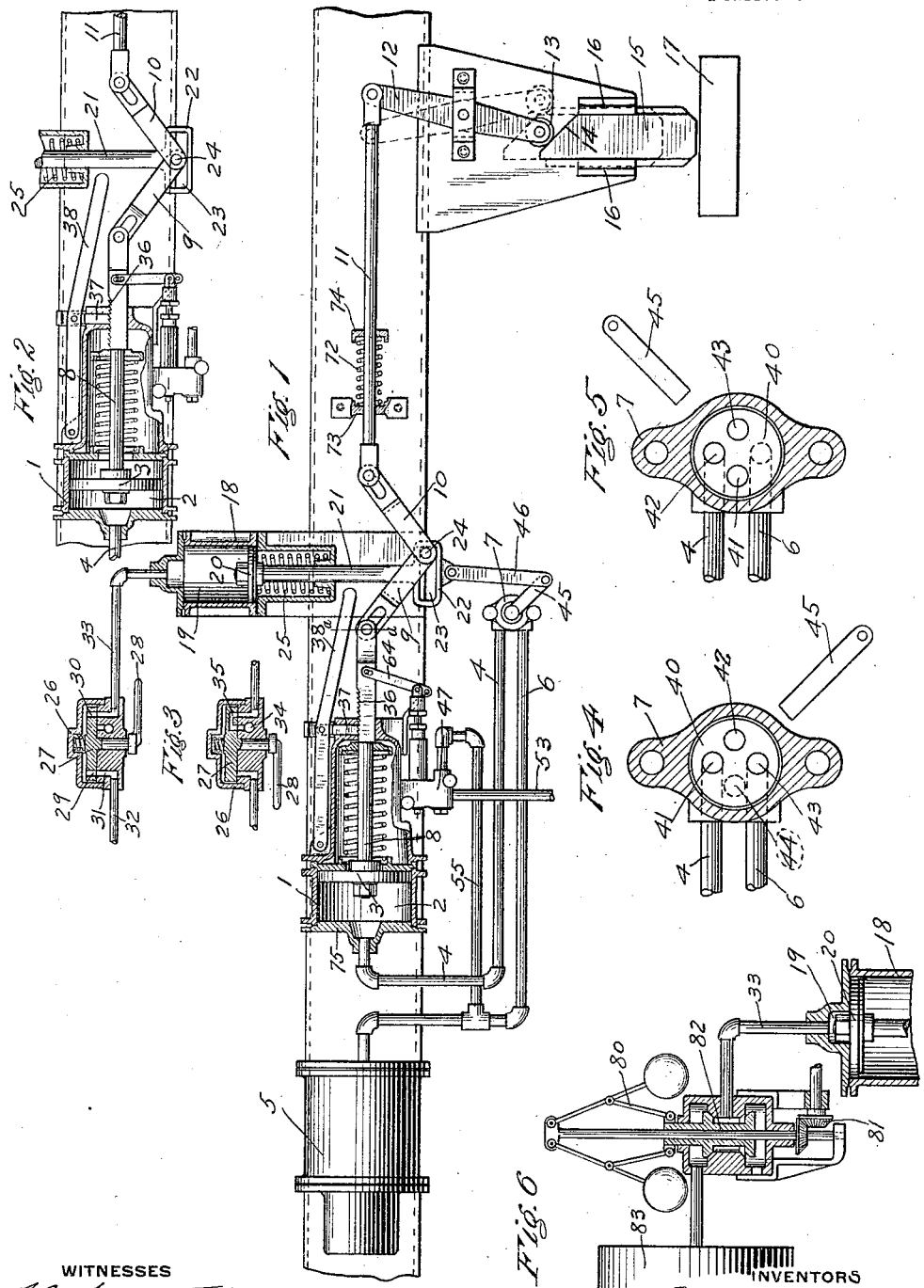

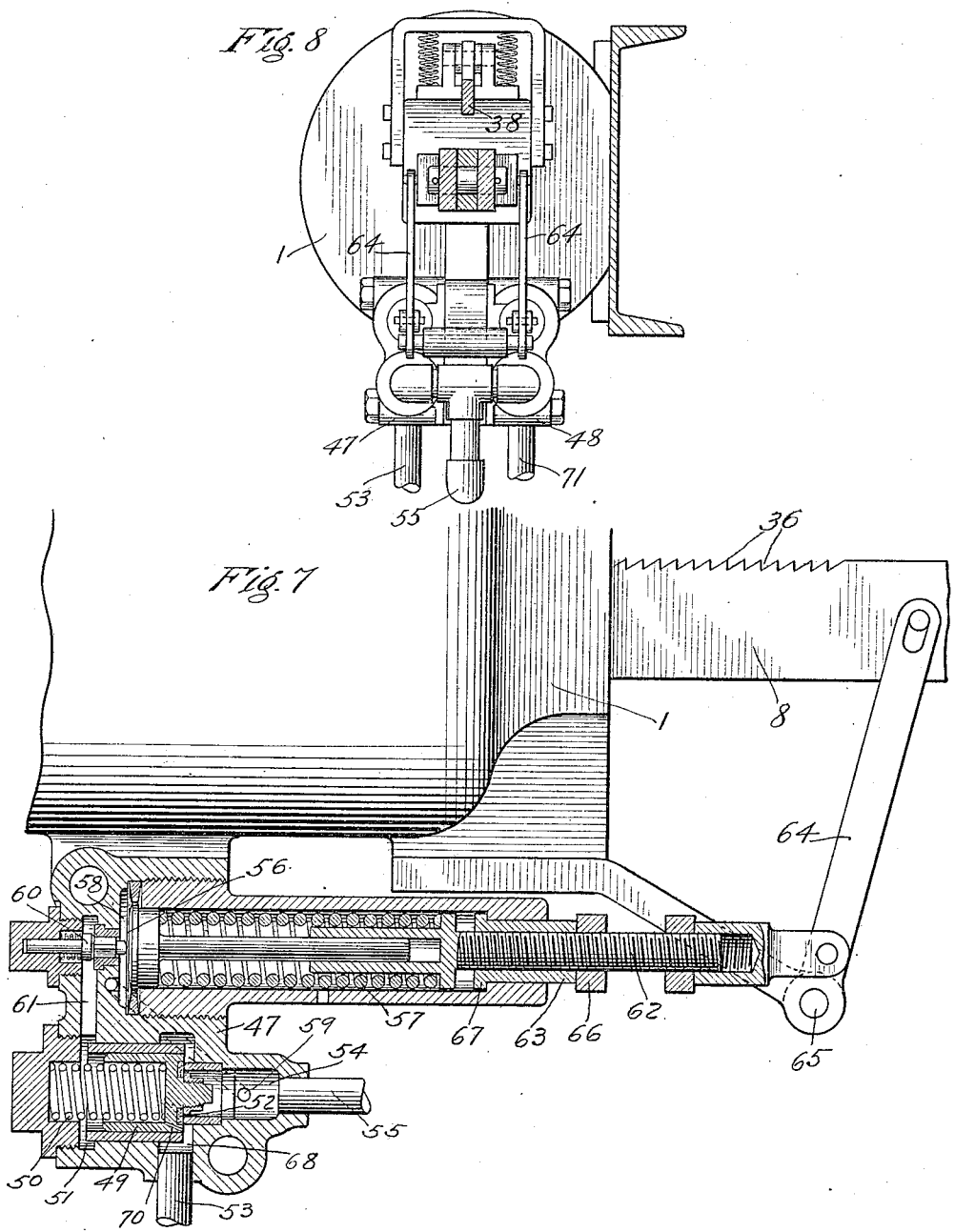

WALTER V. TURNER, OF EDGEWOOD, PENNSYLVANIA, AND EDWARD H. DEWSON, OF NEW YORK, N. Y., ASSIGNORS TO THE WESTINGHOUSE AIR BRAKE COMPANY, OF WILMERDING, PENNSYLVANIA, A CORPORATION OF PENNSYLVANIA.

VARIABLE-LOAD BRAKE.

1,230,949.   Specification of Letters Patent.   Patented June 26, 1917.

Application filed January 2, 1914. Serial No. 810,047.

*To all whom it may concern:*

Be it known that we, WALTER V. TURNER and EDWARD H. DEWSON, citizens of the United States, residents of Edgewood, in the county of Allegheny and State of Pennsylvania, and New York, in the county of New York and State of New York, respectively, have invented a certain new and useful Improvement in Variable-Load Brakes, of which the following is a specification.

This invention relates to fluid pressure brakes, and more particularly to an apparatus for securing a braking power varying in accordance with the load on the car.

Our invention is more particularly designed for use in connection with electric traction service, although not limited to such service.

One object of our invention is to provide a load brake apparatus in which the variable braking power is secured by varying the effective volume of the brake cylinder.

Another object of our invention is to provide an automatic load regulated brake having means for preventing the effective action of the regulating mechanism when the car is running.

Another object of the invention is to provide means for limiting the maximum pressure of fluid supplied to the brake cylinder in making an application of the brakes in accordance with the load on the car.

Other objects and advantages will be noted in the following more detailed description of the invention.

In the accompanying drawings; Figure 1 is a diagrammatic view of a load brake apparatus applied to a car and embodying our improvements; Fig. 2 a view of a portion of the brake cylinder volume adjusting mechanism shown in Fig. 1, with the parts in an intermediate load adjusted position; Fig. 3 a sectional view of the valve device for controlling the cutting in and out of the adjusting means for the braking power regulating mechanism, showing the valve in the cut-in position; Fig. 4 a sectional view of the valve device for controlling communication from the volume regulating cylinder to the brake cylinder, showing the valve in open position; Fig. 5 a similar view, showing the valve in closed position; Fig. 6 a view of a modified construction for cutting out the adjusting means when the car is running; Fig. 7 an enlarged sectional view of one of the brake cylinder pressure limiting valve devices; and Fig. 8 a sectional view of the brake cylinder volume regulator on the line $a$—$a$ of Fig. 1.

According to our invention, a brake cylinder volume adjusting device is provided, comprising a cylinder 1 having a piston chamber 2 containing a piston 3. The piston chamber 2 is connected to a pipe 4 and communication from the piston chamber 2 to the brake cylinder 5 is established by connecting the pipe 4 with brake cylinder pipe 6 through the operation of a valve device 7.

The effective volume of the brake cylinder 5 thus depends upon the position of the piston 3 in cylinder 1 and in order to vary this volume according to the load on the car, said piston is operatively connected to a mechanism responsive to variations in the load.

For this purpose, the piston rod 8 of the piston 3 is connected through toggle levers 9 and 10 with a rod 11, the outer end of which is pivoted to one end of a lever 12. Said lever is pivotally mounted on the car body and is preferably provided at its opposite end with a roller 13 adapted to engage an inclined surface 14 of a slide 15. The slide 15 is mounted in suitable guides 16 with the lower end thereof in engagement with spring plank 17 so that when the car body settles through the action of a load on the car the lever 12 is moved down and roller 13 is forced laterally.

According to another feature of our invention, means are provided for preventing the effective operation of the load controlled mechanism when the car is running and preferably we accomplish this by interlocking the same with the operation of the pneumatic door operating apparatus.

As shown in Fig. 1 of the drawings, a cylinder 18 may be provided having a piston chamber 19 containing a piston 20. The piston 20 carries a piston rod 21 provided at its outer end with an enlargement 22 having a horizontal slot 23 for the reception of the connecting pivot pin 24 of the toggle levers 9 and 10.

When the piston 20 is shifted outwardly the toggle levers are thrown out of line, as shown, so that any movement of the rod 11 is not transmitted to the piston rod 8, but upon movement of the piston 20 inwardly, the toggle levers are brought into alinement, and the load regulated mechanism is then effective to shift the volume adjusting piston 3.

A spring 25 acts on the piston 20 in a direction tending to shift the toggle levers into alinement and the piston 20 is adapted to be shifted in the opposite direction by admitting fluid under pressure to the piston chamber 19.

The reference numeral 26 indicates a manually operated valve device for controlling the car doors and according to our invention, this valve device is arranged to supply and release fluid under pressure to and from the piston chamber 19 at the same time that fluid is supplied and released for operating the doors.

Said valve device 26 may comprise a rotary valve 27 operated by a handle 28 and provided with through ports 29 and 30. In one position of the valve 27, port 29 registers with a port 31 leading to a source of fluid supply, pipe 32, and port 30 with a port leading to pipe 33, opening into the piston chamber 19, so that fluid is supplied in this position to the piston chamber 19. In the other position, as shown in Fig. 3, pipe 33 is connected to an exhaust port 34 through a cavity 35 in the rotary valve 27.

In order to lock the piston 3 in its load adjusted position, the piston rod 8 is preferably provided on one side with a series of teeth 36 with which a laterally movable pawl 37 is adapted to engage.

The pawl 37 is pivotally connected to an operating lever 38 having its inner end pivoted to the cylinder 1 and having its outer end in position to be engaged by the toggle lever 9 upon movement thereof to the position of alinement. The pawl 37 is maintained in locking engagement with the teeth 36 by gravity when the toggle levers are in the cut-out position, but upon shifting the parts to the cut-in position, the toggle lever 9 engages the end of the lever 38 and raises the same, so as to lift the pawl 37 out of engagement with the teeth 36.

In operation, if the car is running, the car door controlling valve device 26 is in the position shown in Fig. 1, and fluid under pressure is supplied to the piston chamber 19, so that the piston 20 is forced outwardly and the toggle levers 9 and 10 are thrown out of alinement. Any movement of the rod 11 due to jolting or like cause will therefore merely cause the toggle lever 10 to turn on the pivot pin 24 and will not be effective to move the piston 3. When the car is stopped, however, the door controlling valve 27 is turned to the position shown in Fig. 3 and fluid is vented from piston chamber 19. The spring 25 thereupon shifts the piston 20 to its inner position, bringing the toggle levers 9 and 10 into alinement.

If the load on the car is increased by passengers entering the car or otherwise, the car springs will be compressed in proportion to the load and the car body moves down carrying with it the lever 12 and causing the roller 13 to be forced laterally so that the rod 11 is shifted and pushes the piston 3 inwardly, thus causing a reduction of the volume in piston cylinder 2, as shown in Fig. 2.

The movement of the toggle lever 9 into alinement operates to lift the end of lever 38, so that the pawl 37 is raised out of engagement with the teeth 36, thus permitting the movement of piston 3 by the rod 11.

Before starting the car, the car door controlling valve is turned to the position for closing the car doors and fluid is again supplied to piston cylinder 19 and the piston is shifted to throw the toggle levers out of line. At the same time, the lever 38 is permitted to drop down, so that the pawl 37 engages the teeth 36 on piston rod 8 and thereby the piston 3 is locked in its load adjusted position.

If an application of the brakes is made, it will be evident that the effective volume of the brake cylinder 5 is reduced by the inward movement of the piston 3 and consequently the brake cylinder pressure obtained for a given reduction in brake pipe pressure is correspondingly increased.

If the load is lightened on the next car stop, the piston 3 will move back and provide a larger volume in the piston chamber 2 so that fluid in applying the brakes equalizes into a larger brake cylinder volume and a correspondingly lighter brake application is secured for a given reduction in brake pipe pressure.

In order to prevent possible leakage of fluid from the brake cylinder around the piston 3, if it is desired to hold the brakes applied while the car is standing still, a valve device 7 is provided comprising a rotary valve 40 having through ports 41, 42, and 43. In the valve seat are ports leading to pipes 4 and 6 and adapted, in one position of the rotary valve, to register with ports 41 and 43 so that in this position, communication is established from the piston chamber 2 to the brake cylinder 5, as shown in Fig. 4.

In another position, as shown in Fig. 5, port 41 registers with an exhaust port 44 and port 42 registers with the port leading to pipe 4, so that in this position the pipe 4 and the piston chamber 2 are open to the exhaust.

For operating the valve 40, a lever 45 is provided and said lever is connected to a link 46 having one end pivoted to the lower end of the piston rod 21. When the car is running, the lever 45 is shifted to the position shown in Fig. 1 and communication is opened between the pipes 4 and 6. Upon stopping the car, the upward movement of the piston rod 21 raises the lever 45 to the position shown in Fig. 5, thus connecting the piston chamber 2 to the atmosphere.

While the load brake apparatus hereinbefore described operates to vary the braking power according to the load on the car, since the same reservoir volume is employed whether the car is light or loaded, it will be seen that in making service applications of the brakes, should a brake pipe reduction be made below the usual equalizing pressure, the brake cylinder pressure on the light cars would be increased by a further discharge of fluid into the brake cylinder while on the loaded cars the final or ultimate pressure due to the equalization of the auxiliary reservoir into the brake cylinder has already been attained. This would then cause the brakes on the light cars to be applied with a greater force than required to maintain the desired relative braking power corresponding with the load on the car.

Similarly in making an emergency application of the brakes, where the brake apparatus is designed to give a higher brake cylinder pressure in emergency than in service, it is desirable to limit the maximum emergency brake cylinder pressure so as to correspond with the load on the car.

In order to limit the maximum brake cylinder pressure which can be obtained in a service application of the brakes, a service pressure limiting valve device adapted to be adjusted according to the load on the car is provided, and since the maximum brake cylinder pressure in emergency may be higher than that in service, another pressure limiting valve device is provided for limiting the maximum pressure in an emergency application of the brakes.

For the above purpose, automatically controlled limiting valve devices 47 and 48 are provided, one for service and the other for emergency.

As these valve devices may be of the same construction, a description of one will answer for the other.

As shown in Fig. 7 of the drawings, the limiting valve device may comprise a valve piston 49 subject on one side to the pressure of a spring 50 and the fluid pressure in chamber 51, and provided with a valve seat 52 for controlling communication from chamber 68 and pipe 53, leading from the valve device which controls the supply of fluid to the brake cylinder, to chamber 54 and pipe 55 leading to brake cylinder 5.

For controlling the movement of the valve piston 49 a pressure regulating valve device is provided, comprising a diaphragm 56, subject on one side to the pressure of an adjustable spring 57 and having the chamber 58 on the opposite side open through a passage 59 to chamber 54, so that this side of the diaphragm 56 is subject to brake cylinder pressure.

The diaphragm 56 is adapted to operate a valve 60 for venting fluid from the chamber 51 through a passage 61 to chamber 58 and the brake cylinder.

The spring 57 may be adjusted to the desired normal pressure by means of the screw-threaded rod 62 and a nut 63 having a shoulder 67 adapted to act as a stop within the spring casing, a jam nut 66 being provided for holding the nut 63 in its adjusted position. In order to automatically vary the resistance of the spring 57 according to the load on the car, the rod 62 is pivotally connected to a lever 64, fulcrumed on the pin 65 and having its opposite end pivotally connected to the piston rod 8.

Assuming that the limiting valve device is for limiting the maximum pressure in a service application of the brakes, the spring 57 is adjusted by means of the nut 63 for the maximum brake cylinder pressure desired on an empty or light car. If the load on the car is increased, and the piston rod 8 be moved inwardly, as hereinbefore explained, the lever 64 is thus operated so as to force the rod 62 inwardly and thereby further compress the spring 57 and by this means automatically adjust the spring 57 to correspond with the load on the car.

If a service application of the brakes is made, fluid from the brake controlling valve device flows through pipe 53 to the area of the valve piston 49 exposed in the seated position of the valve and said valve is thereupon lifted from its seat, so that fluid is free to flow from the pipe 53 to chamber 54 and the brake cylinder pipe 55. In the open position of valve piston 49, the full area is exposed to the inflowing fluid under pressure and the valve is thus maintained in open position, since the parts are so proportioned that the pressure of fluid in chamber 68 is somewhat higher than after the fluid has passed into the chamber 54.

Fluid from chamber 54 also flows through passage 59 to diaphragm chamber 58, but so long as the pressure therein is less than that for which the spring 57 is adjusted, the valve 60 is held open, so that the fluid pressure in chamber 51 is maintained at the pressure in chamber 54 which is slightly less than the pressure in chamber 68 since there is necessarily a drop in pressure in flowing from chamber 68 to chamber 54 and the somewhat higher pressure on the opposite side of the valve piston in chamber 68 consequently holds the same open. If the brake cylinder pressure should be increased so as to slightly exceed the resisting pressure of spring 57, the diaphragm will be actuated so as to permit the valve 60 to close.

The closure of valve 60 permits the higher fluid pressure in chamber 68 to equalize through the restricted port 70 in the valve piston into the chamber 51, so that the spring 50 then operates to shift the valve piston to its seat and thereby prevent further flow of fluid to the brake cylinder.

The limiting valve device 48 is similar to the valve device 47 in construction but is employed to limit the maximum pressure in an emergency application of the brakes according to the load on the car. A separate pipe 71 is provided for supplying fluid from the brake controlling valve to the limiting valve device 48, means being provided in said brake controlling valve for supplying fluid in service applications through the pipe 53 and in emergency applications of the brakes through the pipe 71.

For yieldingly maintaining the roller 13 against the surface 14, a spring 72 is mounted on the rod 11 and acts between a fixed abutment 73 and a collar 74 secured to the rod 11.

If the compression of the car springs is excessive, the roller 13 will be moved laterally by engagement with the surface 14 until the vertical face of the slide 15 is reached and then further vertical movement of the car body will not be effective to cause further lateral movement of the roller 13, since the roller will then engage the vertical side face of the slide, as shown in dotted lines in Fig. 1. This prevents excessive movement of the piston 3 which might cause the piston to force out the head 75 of cylinder 1.

Instead of controlling the cutting in and out of the mechanism for adjusting the parts according to the load by means of the door controlling device, other means operating according to whether the car is running or standing may be employed. For example, a speed governor may be arranged to control the admission and release of fluid to and from the piston chamber 19. As shown in Fig. 6 of the drawings, a ball governor 80 may be provided, which is operatively connected, as by the gear connection 81, to a rotating member on the car. The governor is adapted to operate a double valve 82 and when the car is running, the governor balls are thrown outwardly, lifting the double valve so as to open communication from a source of pressure 83 to pipe 33 leading to piston chamber 19.

The load controlled mechanism is thus cut out when the car is running by the movement of piston 20. When the car is standing, the governor balls drop to the position shown in Fig. 6, closing the supply valve and opening the exhaust valve of the double valve 82, so that fluid is vented from piston chamber 19 and the piston 20 is shifted to its inner position, thus moving the toggle levers 9 and 10 to the cut-in position.

Having now described our invention, what we claim as new and desire to secure by Letters Patent, is:—

1. In a load regulated brake, the combination with a brake cylinder, of a chamber adapted to communicate with said brake cylinder, a movable abutment for varying the volume of said chamber, means for moving said abutment according to the load on the car, and means for locking said abutment in its adjusted position.

2. In a load regulated brake, the combination with a device operated by the load on the car for regulating the braking power according to the load on the car, of means for automatically preventing the operation of said device when the car is running.

3. In a load regulated brake, the combination with a device for automatically adjusting the braking power in proportion to the load on the car, of means for automatically cutting said device out of effective operation when the car is running.

4. In a load regulated brake, the combination with a mechanism adapted to be adjusted to vary the braking power and means operating according to the load on the car for adjusting said mechanism, of a device operated by an act associated with the starting of the car for operatively disconnecting said mechanism from said means.

5. In a load regulated brake, the combination with a brake cylinder, of a movable abutment for varying the effective volume of said brake cylinder, means governed according to the load on the car for operating said abutment, toggle levers for operatively connecting said means to said abutment, and a device operated when the car is running for throwing said levers out of alinement to thereby operatively disconnect said means from said abutment.

6. In a load regulated brake, the combination with a mechanism for varying the braking power and means for adjusting said mechanism according to the load on the car, of a device for controlling the car doors and adapted to control the operative connection of said means with said mechanism.

7. In a load regulated brake, the combination with a mechanism for varying the braking power and means for adjusting said mechanism according to the load on the car, of a device for effecting the opening and closing the car doors and adapted to operatively disconnect said means from said mechanism upon effecting the closing of the doors.

8. In a load regulated brake, the combination with a mechanism for varying the braking power and means for adjusting said mechanism according to the load on the car, of a fluid pressure controlled device for cutting said means out of effective operation and a manually operated valve for controlling the fluid pressure for effecting the opening and closing of the car doors and for controlling the fluid pressure on said fluid pressure controlled device.

9. In a load regulated brake, the combination with a mechanism for varying the braking power, means for adjusting said mechanism to provide braking power corresponding with the load on the car, and toggle levers for operatively connecting said means to said mechanism, of a piston operated by fluid pressure for throwing said toggle levers out of alinement to thereby disconnect said means from said mechanism and a manually operated valve for controlling the fluid pressure on said piston.

10. In a load regulated brake, the combination with a mechanism for varying the braking power, means for adjusting said mechanism to provide braking power corresponding with the load on the car, and a device for operatively disconnecting said means from said mechanism, of a locking device for locking said mechanism in its adjusted position upon disconnection of said means from said mechanism.

11. In a load regulated brake, the combination with a mechanism for varying the braking power, means for adjusting said mechanism to provide braking power corresponding with the load on the car, and toggle levers for operatively connecting said means to said mechanism, of a locking device for locking said mechanism in its adjusted position when said levers are thrown out of alinement, said device being operated upon movement of the levers to operative position for unlocking said mechanism.

12. In a load regulated brake, the combination with a mechanism for varying the braking power, of a member having a fixed relation to and movable with the car truck and having an inclined face and an adjusting lever mounted on the car body and operated by engagement with said inclined face upon vertical movement of the car body under load for adjusting said mechanism according to the position of the lever on the inclined face.

13. The combination with a mechanism for varying the braking power, of a lever mounted on the car body, the angular position of which is adapted to determine the adjustment of said mechanism and a slide carried by the car truck and having an inclined face for engaging said lever upon vertical movement of the car body relative to the truck and adapted to change the angularity of the lever in accordance with variations in the load on the car.

14. In a load regulated brake, the combination with a brake cylinder, of a chamber for varying the effective volume of said brake cylinder and valve means for automatically cutting off communication from the brake cylinder to said chamber when the car is stopped.

15. In a load regulated brake, the combination with a brake cylinder, of a chamber for varying the effective volume of said brake cylinder and valve means operated upon starting the car for opening communication from the brake cylinder to said chamber and upon stopping the car for closing said communication.

16. In a load regulated brake, the combination with a brake cylinder and a chamber for varying the effective brake cylinder volume, of means for regulating the volume of said chamber according to the load on the car, a device for cutting said means out of action, and valve means operated by said device for controlling communication from the brake cylinder to said chamber.

17. The combination with a load regulated mechanism for limiting the brake cylinder pressure in gradual applications of the brakes according to the load on the car, of valve means governed by the load on the car for limiting the maximum brake cylinder pressure according to the load on the car.

18. The combination with a brake pipe and a load regulated mechanism for limiting the brake cylinder pressure in gradual applications of the brakes according to the load on the car under reductions in brake pipe pressure up to a predetermined degree, of valve means governed by the load on the car for preventing a further increase in brake cylinder pressure upon a reduction in brake pipe pressure below said predetermined degree.

19. In a load regulated brake, the combination with a brake cylinder, a source of fluid under pressure, a brake pipe, and means for supplying fluid from said source to the brake cylinder upon a reduction in brake pipe pressure, of a load regulated mechanism operating at a predetermined reduction in brake pipe pressure to permit full equalization of the source into the brake cylinder on a fully loaded car and to limit the brake cylinder pressure to less than the equalizing pressure on a car under less than full load and valve means operating according to the load on the car for preventing a further increase in brake cylinder pressure upon a reduction in brake pipe pressure below said predetermined degree.

20. In a load regulated brake, the combination with a brake cylinder, of valve means operative only in an emergency application of the brakes for limiting the pressure of fluid supplied to the brake cylinder to a predetermined maximum degree and a mechanism operated according to the load on the car for adjusting said valve means to vary the maximum brake cylinder pressure to correspond with the load on the car.

21. In a fluid regulated brake, the combination with a brake cylinder, of valve means for limiting the maximum pressure of fluid supplied to the brake cylinder, means for adjusting said valve means to a maximum pressure corresponding with the load on the car, and means for locking said valve means in its adjusted position when the car is running.

22. In a fluid regulated brake, the combination with a brake cylinder, of valve means for limiting the maximum pressure of fluid supplied to the brake cylinder, means for adjusting said valve means to a maximum pressure corresponding with the load on the car when the car is standing, and means for locking said valve means in its adjusted position when the car is running.

23. In a load regulated brake, the combination with a valve device for limiting the pressure of fluid supplied to the brake cylinder to a predetermined maximum degree, of a mechanism controlled according to the load on the car for adjusting said valve device, and means for operatively disconnecting said mechanism from said valve device when the car is running.

24. In a load regulated brake, the combination with a valve device for limiting the pressure of fluid supplied to the brake cylinder to a predetermined maximum degree, of a mechanism controlled according to the load on the car for adjusting said valve device, means for operatively disconnecting said mechanism from said valve device when the car is running, and means for locking said valve device in its adjusted position.

25. In a load regulated brake, the combination with a brake cylinder, of valve means for limiting the pressure of fluid supplied to the brake cylinder in service applications to one maximum degree and in emergency applications to another maximum degree, and a mechanism operated according to the load on the car for adjusting said valve means to vary the maximum brake cylinder pressure to correspond with the load on the car.

26. In a load regulated brake, the combination with a brake cylinder, a chamber for varying the effective volume of said brake cylinder, a movable abutment for varying the volume of said chamber, and a mechanism governed by the load on the car for shifting said abutment, of a limiting valve device for limiting the maximum pressure of fluid supplied to the brake cylinder in applying the brakes and means controlled by said mechanism for adjusting said limiting valve device to provide a maximum brake cylinder pressure corresponding with the load on the car.

In testimony whereof we have hereunto set our hands.

WALTER V. TURNER.
EDWARD H. DEWSON.

Witnesses:
A. M. CLEMENTS,
E. C. TRAUTMAN.

Copies of this patent may be obtained for five cents each, by addressing the "Commissioner of Patents, Washington, D. C."